Patented Sept. 23, 1941

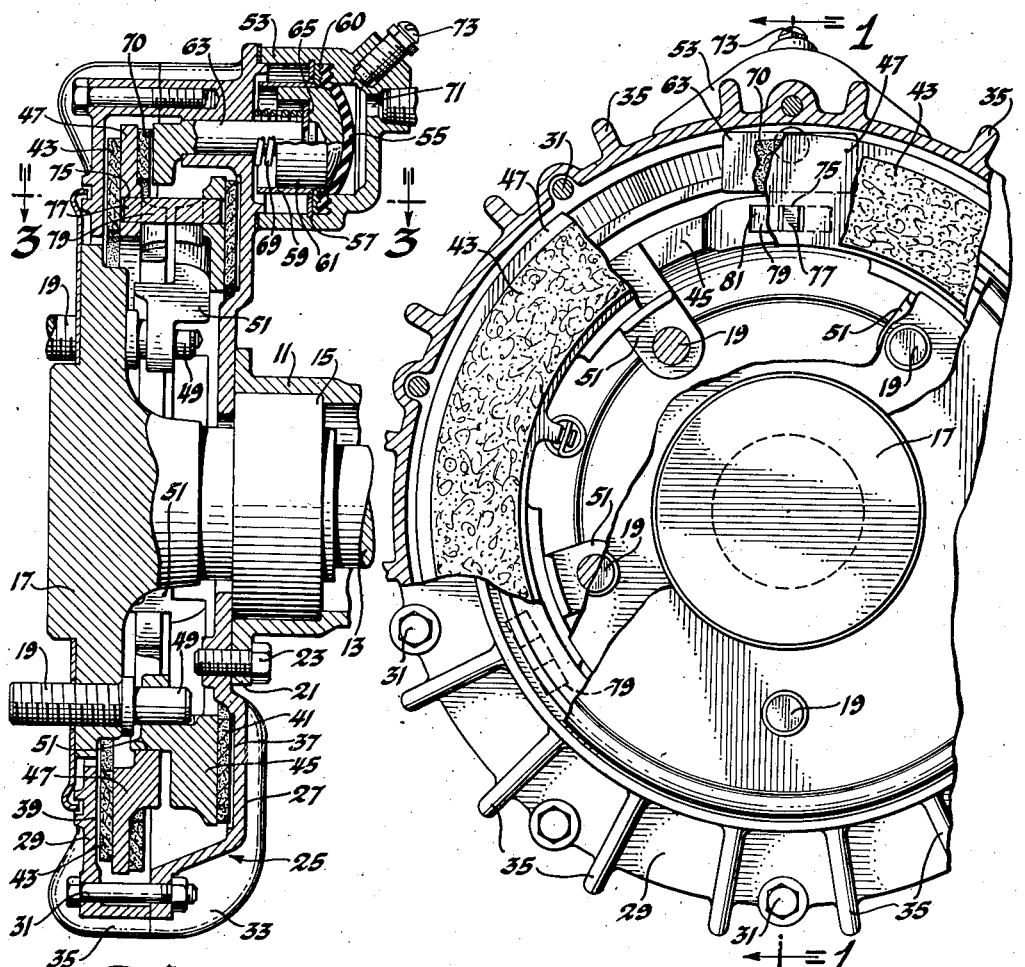

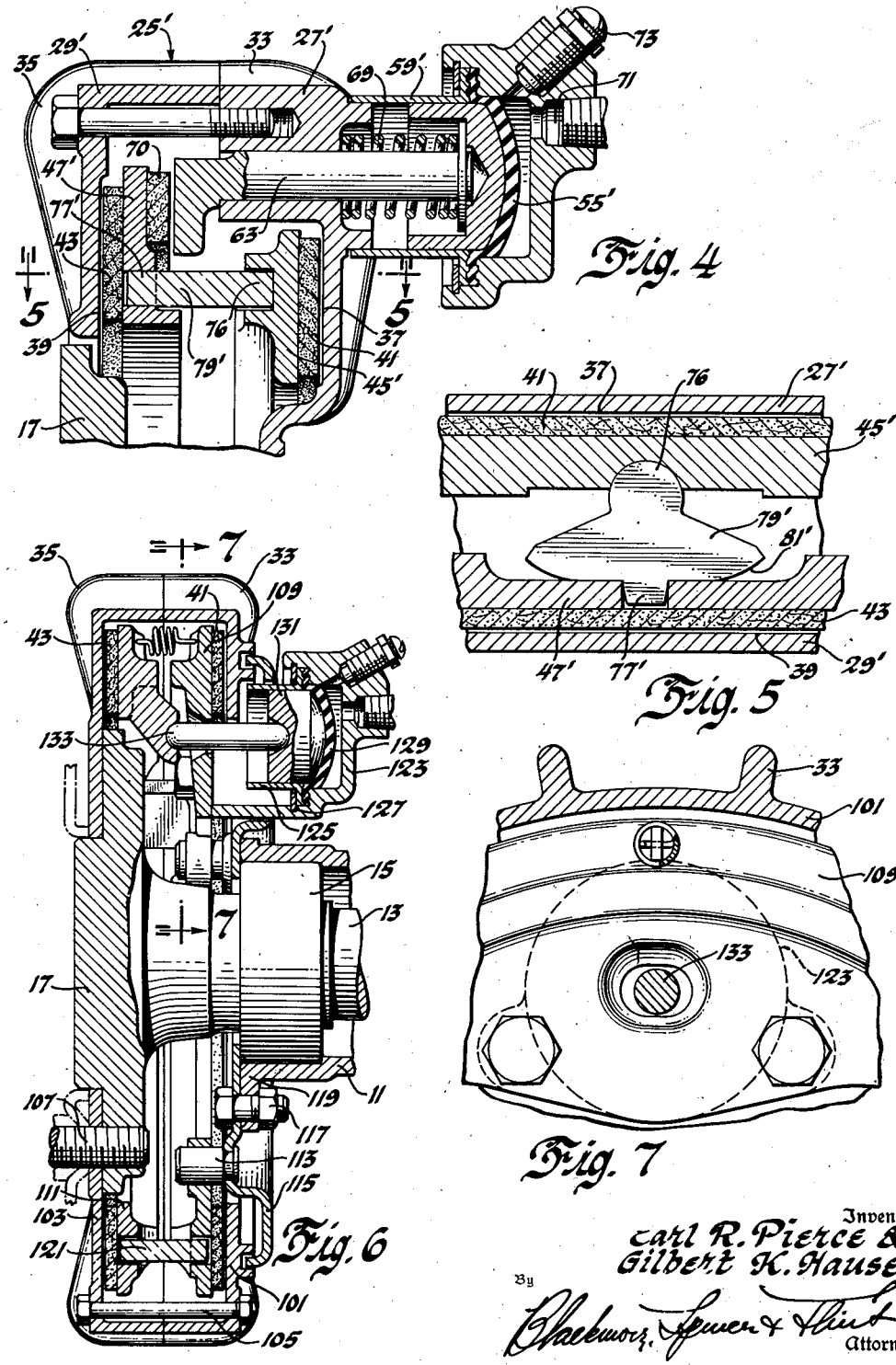

2,256,725

UNITED STATES PATENT OFFICE 2,256,725

DISK BRAKE

Earl R. Pierce and Gilbert K. Hause, Dayton, Ohio, assignors to General Motors Corporation, Detroit, Mich., a corporation of Delaware Application June 5, 1939, Serial No. 277,407

12 Claims. (Cl. 188—72)

This invention relates to brakes and particularly to disk brakes for checking the travel of vehicles.

An object of the invention is to provide a disk brake assembly in which the applying mechanism requires minimum effort to obtain effective braking.

Other advantages will appear from a reading of the description which follows.

On the accompanying drawings:

Figure 1 is a transverse section through the novel brake mechanism, the section being on line 1—1 of Figure 2.

Figure 2 is a view in elevation, partly broken away.

Figure 3 is a section on line 3—3 of Figure 1.

Figure 4 is a transverse section of a slightly modified form.

Figure 5 is a section on line 5—5 of Figure 4.

Figure 6 is a transverse section of another form, and

Figure 7 is a view as seen from line 7—7 of Figure 6.

Referring by numerals to the drawings, an axle housing is identified by numeral 11, the rotating axle within the housing being marked 13. Between the axle and the housing is a conventional bearing 15 shown in elevation. To better illustrate the invention the wheel is omitted. It is secured to the flange 17 of the rotating axle by suitable studs such as 19. To a flange 21 of the fixed axle 11 is secured by a plurality of fastening means 23 a housing designated as a whole by numeral 25. This housing includes a member 27 and a mating member 29, the members secured together by fastening means 31. These two members are provided with cooling fins marked 33 and 35. Members 27 and 29 have annular surfaces 37 and 39 respectively and engaging frictional facings 41 and 43 are carried by pressure disks 45 and 47. Disk 45 is mounted to slide axially relative to and to rotate with axle 13. This sort of support is provided by apertures in the disk 45 through which extend guiding pins 49 on the inner ends of studs 19. Disk 47 is centralized by being mounted upon an annular shoulder 51 of member 45. It therefore may move axially and it may rotate to a limited extent upon shoulder 51.

Secured in any convenient way to the fixed housing 27 at one point in its circular wall is a motor unit or wheel cylinder 53 which cylinder constitutes a part of a hydraulic brake system. It employs a sealing diaphragm 55 held in position at its periphery by anchoring means, the latter being positioned by snap ring 57. The anchoring means takes the form of a radial flange 60 on an inner cylinder 59. Reciprocable within cylinder 59 is a piston 61. The plunger 63 carrying a disk 65 is normally projected toward the brake release position by a spring 69 seated against the disk 65 and against the adjacent wall of member 27. The plunger extends through an opening in this wall as shown in Figure 1. The plunger operates against the suitable friction facing 70 carried by member 67 on the side thereof remote from facing 43. Hydraulic medium is admitted to the cylinder through opening 71 from a conventional master cylinder. 73 is a normally plugged air vent.

At a plurality of circumferentially distributed positions the members 45 and 47 have opposed notches 75 to receive tooth shaped lugs 77 of disk expanding cams 79 which cams have rounded surfaces 81 between their ends 83 and the lugs 77. These may be described as cams of such shape that relative angular motion of pressure disks 45 and 47 produce a corresponding spreading of the disks. Such cams will have flats as shown on Figure 3 which provides the consequent detent action restoring the disks to their full-release position.

The operation of the brake mechanism is evident but may be briefly explained. Members 27 and 29 are held from rotation as explained above, while the disks 45 and 47 rotate with the axle 13 and the wheel, the attachment being made by the pins 49 passing through openings in the member 45. In applying the brake, the plunger 63 is moved to the left. It pushes disk 47 into contact with friction surface 39 of the housing. The engagement of the rotating disk with the stationary housing produces a relative rotation between the two disks. The effect of such rotation may best be appreciated by reference to Figure 3. It will be seen that the relative movement referred to operates through the instrumentality of the surfaces 81 of the cams to spread the disks apart into engagement with the corresponding friction surfaces of the non-rotatable housing. In so operating, inasmuch as the friction occurs between the housing faces and the friction facings carried by the members 45 and 47 and for the reason that these friction facings are poor conductors of heat, the friction produced heat is transmitted through the walls of the housing and the radiating fins 33 and 35 assist in carrying it away.

In Figures 4 and 5 is shown a similar arrangement wherein the fixedly anchored housing is marked 25' and is made up of two members 27' and 29'. The diaphragm 55' is secured substantially as in Figure 1. In this case the cylinder 59' is secured to member 27'. In this form of the invention there is used a cam 79' having a rounded part 76 seated in a correspondingly shaped recess of member 45'. It has a toothlike lug 77' in a recess of member 47'. As the cam is moved by a movement of 45' relative to 47' the rounded part 76 rocks in the recess and one or the other of the rounded surfaces 81' spreads the members 45' and 47' apart and into contact with the walls of the housing as before. It will be evident that the device functions substantially as does the cam shown in Figure 3 which is a preferred construction.

In Figures 6 and 7 is an arrangement where a housing is formed by securing together members 101 and 103 by fastening means 105. In this case the housing is not anchored to the fixed axle housing but rotates with the axle and wheel, being secured to the axle by the wheel studs 107. Within the housing are friction disks 109 and 111 adapted to be spread apart to frictionally engage the walls of the housing. Friction disk 109 is mounted to slide axially upon a plurality of pins one of which is shown at 113. These pins are fixedly related to the axle housing being carried by an anchor plate 115 secured as at 117 to a flange 119 of the axle housing. Between the disks 109 and 111 are spreading cams 121 which may be like those of Figure 3 or of Figure 5 or of any other form preferred. Any "cocking" of the plate operated by the off-center wheel cylinder is corrected by the symmetrically disposed cams. In this form the hydraulic wheel motor includes an outer cylinder 123 secured to disk 109. An inner cylinder 125 the flange of which is anchored to cylinder 123 by a snap ring 127 serves to grip the marginal edge of a diaphragm 129. The piston 131 slidable in cylinder 125 pushes by means of a push rod 133 the disk 111 against the cooperating wall of a rotatable housing. Push-rod 133 may have the shape of a sector such that rotation of disk (1) will not effectively change the distance from piston 131 to disk (1). Slight rotation of disk 111 with the housing and relative to disk 109 operates through the cams 121 to spread both disks as before and thereby check the rotation of the wheel.

In each embodiment there is a housing having opposite parallel walls with inner frictional surfaces between which are disks adapted to engage these surfaces. In each case a hydraulic motor located at some convenient position adjacent the circumference of the housing causes one of the disks to engage its cooperating housing surface and in each case the cams between the disks then spread the disks into frictional contact. In this way a slight manual effort is supplemented by a servo mechanism in consequence of which powerful braking is effected.

We claim:

1. In a brake, a rotating member, a member adjacent thereto fixed from rotation, first friction means secured to one of said members and having spaced frictional walls fixed in position relative to each other, second frictional means including two disks between said walls and mounted to move axially apart to engage said walls, at least one of said disks being anchored from rotation relative to the other member and cams operable to spread said disks into contact with said walls in response to relative rotation of said disks, and a single motor means only, said motor means being positioned at one point about the circumference of the device and operably associated with one only of said disks and spaced from said cams and operable to move said one disk into contact with its cooperating wall to produce such relative rotation.

2. The invention defined by claim 1, said first friction means being a housing, the internal surfaces of its walls being engaged by said discs.

3. The invention defined by claim 1, said walls being externally exposed to the air and said disks having non-conducting friction facings whereby developed heat is transmitted through said walls.

4. The invention defined by claim 1, said motor means being secured to one of said friction means.

5. The invention defined by claim 1, said motor means being secured to the first mentioned friction means.

6. The invention defined by claim 1, said motor means being carried by said anchored disk.

7. In a brake, a first and rotating member, a second member adjacent thereto and held from rotation, first friction means having spaced parallel walls, said first friction means being secured to said second member, a second friction means comprising axially reciprocable disks between and adapted to be moved to engage said spaced walls, means whereby one of said discs is held from rotation relative to the first member, the other disk having limited rotation relative to the first, cam means between said discs and motor means carried by the first friction means operable to move said other disk into contact with the adjacent wall.

8. The invention defined by claim 7, said disks having notches upon adjacent edges and said cams having lugs received therein, said cams having rounded surfaces on each side of one of said lugs and operable to spread said disks.

9. The invention defined by claim 7, said disks having notches and said cams having lugs received therein, rounded surfaces on said cams to spread said disks in response to cam rotation and flats on said cams to predetermine the idle position of said disks.

10. The invention defined by claim 1, said motor means including a fluid chamber, a movable seal closing said chamber, a plunger moved by said seal and a member between said plunger and the said disk, said member having a part of arcuate shape to engage said disk.

11. In a brake, a first and rotating member, a second member adjacent thereto and held from rotation, first friction means having spaced parallel walls, said first friction means being secured to said first member, a second friction means comprising axially reciprocable disks between and adapted to engage said walls, means whereby one of said discs is anchored from rotation relative to the second member, the other disk having limited rotation relative to the first, cam means between and operable to spread said disks and motor means carried by the anchored disk and operable to move the unanchored disk into contact with the adjacent wall, said disks having notches upon adjacent edges and said cams having rounded surfaces engaging said disks and lugs adapted to be received within said notches.

12. In a brake, a first and rotating member, a second member adjacent thereto and held from rotation, first friction means having spaced parallel walls, said first friction means being secured to said first member, a second friction means comprising axially reciprocable disks between and adapted to engage said walls, means whereby one of said disks is anchored from rotation relative to the second member, the other disk having limited rotation relative to the first, cam means between and operable to spread said disks and motor means carried by the anchored disk and operable to move the unanchored disk into contact with the adjacent wall, said disks having notches and said cams having lugs received within said notches, rounded surfaces between said lugs and the extremities thereof and flats between said rounded surfaces and said lugs.

EARL R. PIERCE.
GILBERT K. HAUSE.